United States Patent
Kim

(10) Patent No.: US 10,592,668 B2
(45) Date of Patent: Mar. 17, 2020

(54) COMPUTER SYSTEM SECURITY WITH REDUNDANT DIVERSE SECONDARY CONTROL SYSTEM WITH INCOMPATIBLE PRIMARY CONTROL SYSTEM

(71) Applicant: HOWARD UNIVERSITY, Washington, DC (US)

(72) Inventor: Charles J. Kim, Annandale, VA (US)

(73) Assignee: HOWARD UNIVERSITY, Washington, DC (US)

(*) Notice: Subject to any disclaimer, the term of this patent is extended or adjusted under 35 U.S.C. 154(b) by 153 days.

(21) Appl. No.: 15/531,139

(22) PCT Filed: Nov. 23, 2015

(86) PCT No.: PCT/US2015/062159
§ 371 (c)(1),
(2) Date: May 26, 2017

(87) PCT Pub. No.: WO2016/085861
PCT Pub. Date: Jun. 2, 2016

(65) Prior Publication Data
US 2018/0307841 A1    Oct. 25, 2018

Related U.S. Application Data

(60) Provisional application No. 62/084,671, filed on Nov. 26, 2014.

(51) Int. Cl.
G06F 21/55 (2013.01)
G06F 21/56 (2013.01)
(Continued)

(52) U.S. Cl.
CPC ............ *G06F 21/567* (2013.01); *G05B 9/02* (2013.01); *G06F 11/1641* (2013.01);
(Continued)

(58) Field of Classification Search
CPC .... G06F 21/567; G06F 11/1641; G06F 21/00; G06F 21/552; G06F 11/00;
(Continued)

(56) References Cited

U.S. PATENT DOCUMENTS 6,853,292 B1 * 2/2005 Kramer ................. G05B 9/03
                                                        324/500
8,301,867 B1   10/2012 Mazuk et al.
(Continued)

FOREIGN PATENT DOCUMENTS

EP    3 115 900 A1    1/2017
WO   2014009243 A2   1/2014

OTHER PUBLICATIONS

European Application No. EP15863918.7; Supplementary European Search Report dated Jul. 20, 2018, 5 pages.
(Continued)

*Primary Examiner* — Ashokkumar B Patel
*Assistant Examiner* — Quazi Farooqui
(74) *Attorney, Agent, or Firm* — Sughrue Mion, PLLC

(57) ABSTRACT

A redundant and diverse secondary control system mirrors a primary control system but has some fundamental structural difference as compared to the primary control system to prevent a spread of a security breach from the primary control system to the secondary control system. The secondary control system may operate on different hardware built on different software written with different programming language as compared to the primary control system while performing the same function as that of the primary system. By hardware coding the algorithm to produce actuation signals, software based viruses and worms cannot interfere with the secondary control system's operation. A monitor device receives actuation signals from both the primary and secondary controls signals to determine
(Continued)

whether an error occurred and to provide correct actuation signals to the controlled system.

22 Claims, 3 Drawing Sheets

(51) Int. Cl.
  *G05B 9/02* (2006.01)
  *G06F 11/16* (2006.01)
  *G06F 11/14* (2006.01)
(52) U.S. Cl.
  CPC ........ *G06F 21/552* (2013.01); *G06F 11/1487* (2013.01); *G06F 11/165* (2013.01)
(58) Field of Classification Search
  CPC .... G06F 11/1487; G06F 11/165; G06F 21/56; G06F 21/55; G05B 9/02; B64C 19/00
  USPC .......................... 726/6, 22–27; 380/252–254
  See application file for complete search history.

(56) References Cited

U.S. PATENT DOCUMENTS

| | | | | |
|---|---|---|---|---|
| 2002/0077782 | A1* | 6/2002 | Fruehling | G06F 11/1008 702/185 |
| 2011/0264242 | A1 | 10/2011 | Nakagawa | |
| 2011/0313580 | A1 | 12/2011 | Bakhmach | |
| 2012/0290153 | A1 | 11/2012 | Olsoe | |
| 2014/0380425 | A1* | 12/2014 | Lockett | H04L 63/20 726/4 |

OTHER PUBLICATIONS

D. Brièrce, C. Favre and R Traverse; A Family of Fault-Tolerant Systems: Electrical Flight Controls, from Airbus A320/330/340 to Future Military Transport Aircraft, Elsevier Science B.V. Microprocessors and Micro systems, vol. 10, No. 2, pp. 75-82; Mar. 1995.
European Application No. EP15863918.7; European Search Opinion dated Jul. 20, 2018, 5 pages.
International Search Report and Written Opinion for PCT/US15/62159, dated Feb. 8, 2016; 13 pages.
Liebert; "High-Availability Power Systems, Part II: Redundancy Options"; Summary of power systems; Jul. 2003; 15 pages.
Kisner, et al.; "Cybersecurity Through Real-Time Distributed Control Systems"; ORNL/TM-2010/30; Prepared by Oak Ridge National Laboratory; Office of Scientific and Technical Information; Oak Ridge, TN; Website: http://www.osti.gov/contact.html; Feb. 2010; 45 pages.

* cited by examiner

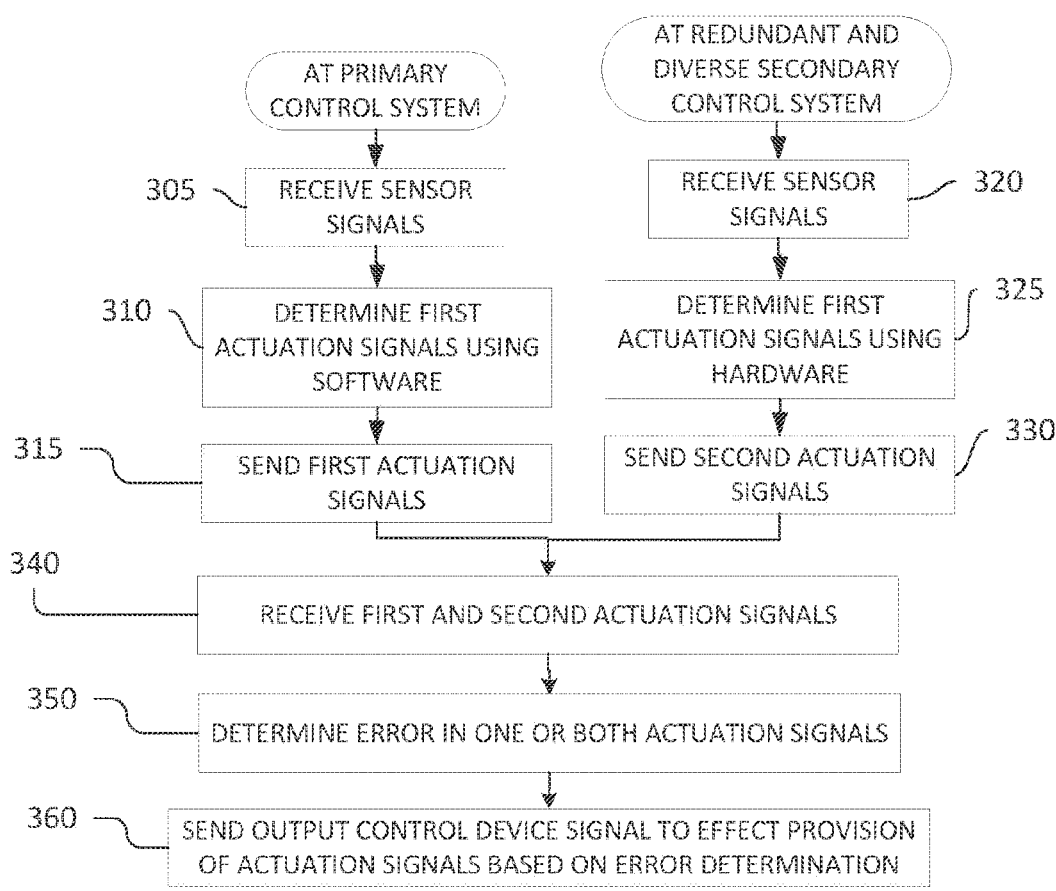

COMPUTER SYSTEM SECURITY WITH REDUNDANT DIVERSE SECONDARY CONTROL SYSTEM WITH INCOMPATIBLE PRIMARY CONTROL SYSTEM

RELATED APPLICATIONS

This application is a U.S. national phase application filed under 35 U.S.C. § 371 of International Application Number PCT/US2015/062159, filed Nov. 23, 2015, designating the United States, which claims the benefit of U.S. Provisional application No. 62/084,671, filed Nov. 26, 2014.

TECHNICAL FIELD

This invention relates generally to computer security and more particularly to confirming the security and normal operation of a control system that is computer controlled.

BACKGROUND

A computer controller is a control system of hardware and software that produces desired output signals to actuators from input signals obtained through sensors. A simple example of the computer controller is a digital thermostat or temperature controller that reads the temperature of a space through temperature sensors and produces a turn-on or turn-off signal to air-conditioner units. More complex computer controllers are engine control systems in cars, programmable logic controllers in manufacturing lines and petrochemical processing plants, and digital relays in unmanned remote power substations.

Present computer controllers are equipped with high-end microprocessors and network capabilities along with sophisticated software, and thus they are now called intelligent electronic devices. These intelligent devices are getting connected to communication servers which in turn provide, via open networks or the Internet, plant operators, system designers and developers, corporate managers, and vendors with convenient access to them for update, maintenance, and modification of the hardware and software components.

FIG. 1 illustrates an example of such a prior art control system 100. A field/plant 105 constitutes the process or mechanism being controlled by the control system 100. The field/plant 105 can be any process or mechanism where a computer can automatically control operation of at least a portion of the process or mechanism such as in the non-limiting examples provided above. A computer controller 110 includes hardware 112 and software 114 aspects to perform its control function and may further include various ports to facilitate communication with other devices such as USB drives or other computing devices to allow updating, analysis, or maintenance of the system, which may be performed by outside vendors. The computer controller 110 receives signals from one or more sensors 120 from the field/plant 105 regarding the controlled process or mechanism. Based on those signals, the computer controller 110 automatically controls at least one actuator 130 to effect some change or control in the process or mechanism of the field/plant 105.

Optionally, the computer controller 110 can connect to a network 140, for example, directly or through a communication server 151. The network 140 can be any network such as a local private network or a public network such as the Internet. Through the network, the computer controller 110 may communicate with a management system 161 that is located, for example, at a corporate level network 170. The management system 161 can update or monitor the computer controller 110.

The convenience of access to the computer controllers, however, poses cyber vulnerability to the controllers of being maliciously or accidentally modified or operated illegitimately. A virus or worm may penetrate to the computer controllers via the infected computer of a vendor and may shut down the entire operation of the controller. An infected thumb drive (or USB memory stick) of a maintenance person who accesses the communication serve may is advertently infect the computer controllers and thus cause a wrong operation immediately or latently. A malicious attack from a hacker who is knowledgeable of the hardware and software structure of a computer controller may be able to access through Internet and false authentication and modify the software code for ill-intended operation to cause havoc such as power outage, sewage spillage, nuclear plant shutdown, or contamination in water treatment.

The current focus on the cyber-security for computer control systems is centered on security measures that include development of security policies, development of access control lists and firewalls and proxy servers, development of event logs to detect malicious cyber activities, and development of updating, upgrading, and patching the software vulnerability. The fundamental problem of the current focus and practice of cyber-security for computer controllers is that it ignores the plain truth that it is impossible to predict cyber events throughout the computer controller's lifecycle, and that, the detection and mitigation strategies may be good for old and known malwares and viruses only.

SUMMARY

Generally speaking, pursuant to these various embodiments, an apparatus and method for providing protection against software based security attacks includes a redundant and diverse secondary control system that mirrors a primary control system. The secondary system, while keeping the same functional design or algorithm as the primary control system, has some fundamental structural difference as compared to the primary control system to prevent a spread of a security breach (such as a computer virus or worm, for example) from the primary control system to the secondary control system. For example, the secondary control system may operate on different hardware built on different software written with different programming language as compared to the primary control system while performing the same function as that of the primary system. For instance, the secondary control system may have a hardware based system incompatible with the primary control system and configured to run at least one hardware-coded algorithm. By hardware coding the algorithm to produce actuation signals, software based viruses and worms cannot interfere with the secondary control system's operation. The secondary control system receives signals from the same sensor that is used by the primary system, monitors an aspect of the controlled process as done by the primary system, and produces actuation signals that can be compared to actuation signals from the primary control system and/or to stored actuation signals to confirm the proper functioning of the primary control system.

So configured, computer controllers can be largely immune to and withstand cyber incidents that may originate from malicious cyber attackers, random or design hardware/software problems in the computer controllers, sabotage from a disgruntled employee, or inadvertent mistakes. These and other benefits may become clearer upon making a thorough review and study of the following detailed description.

BRIEF DESCRIPTION OF THE DRAWINGS

The above needs are at least partially met through provision of the computer control system security approach described in the following detailed description, particularly when studied in conjunction with the drawings, wherein:

FIG. 3 comprises a flow diagram of an example method of operation of an example control system as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings nave otherwise been set forth herein.

DETAILED DESCRIPTION

Figure 1:
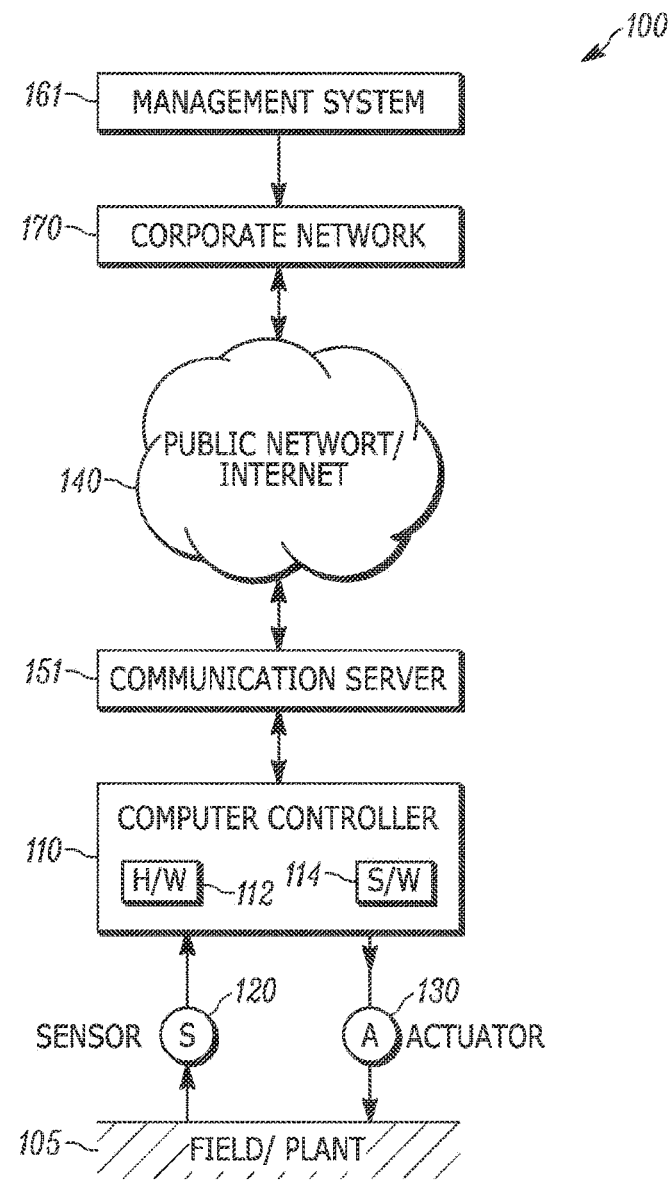
FIG. 1 comprises a block diagram of a prior art computer control system.
Figure 2:
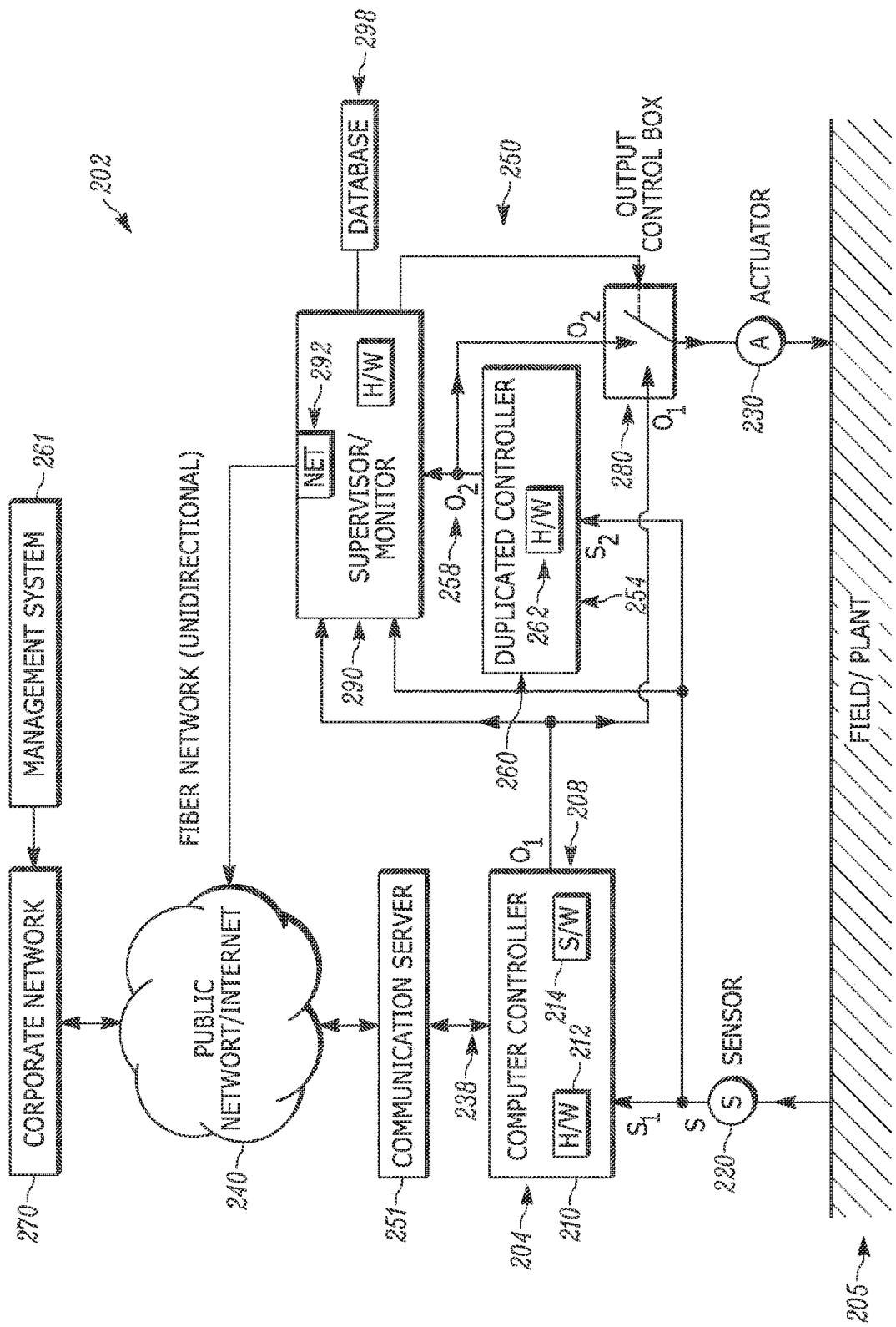
FIG. 2 comprises a block diagram of an example control system as configured in accordance with various embodiments of the invention.

Referring now to the drawings, and in particular to FIG. 2, an illustrative apparatus providing protection against software based security attacks that is compatible with many of these teachings will now be presented. The apparatus includes a primary control system 202 including an input port 204 configured to receive sensor signals $S_1$ from a sensor 220. Depending on the implementation, the sensor 220 provides a state or status from a controlled system 205 regarding the process or mechanism controlled by the control system. The primary control system 202 also includes an output port 208 configured to send first actuations signals $O_1$ configured to control operation of at least a portion of the controlled system 205. A computer controller 210 includes a hardware component 212 running at least one software 214 based algorithm configured to output the first actuation signals based on the sensor signals. Optionally, the primary control system 202 further includes a communication port 238 configured to provide two-way communication with a communication server 251 or a wide area network 240. The computer controller 210 can connect to the network 240, for example, directly or through the communication server 251. The network 240 can be any network such as a local private network or a public network such as the internet. Through the network 240, the computer controller 210 may communicate with a management system 261 that is located, for example, at a corporate level network 270. The management system 261 cars update or monitor the computer controller 210 through the network based communication path.

A redundant and diverse secondary control system 250 includes a second input port 254 configured to receive the sensor signals $S_1$ from the sensor 220 and a second output port 258 configured to send second actuations signals $O_2$ configured to control operation of the at least a portion of the controlled system 205. The secondary control system 250 further includes a hardware based system 260 incompatible with the primary control system 202 and configured to run at least one hardware-coded algorithm 262 and to output the second actuation signals $O_2$ based on the sensor signals $S_1$. The second actuation signals $O_2$ are substantially identical to the first actuation signals $O_1$ when the primary 202 and secondary 250 control systems operate in an expected manner. In one example, the hardware based system 260 includes a field programmable gate array (FPGA) to implement the logic to create the secondary actuation signals $O_2$ in response to the sensor signals $S_1$ such that the system 260 does not include a software component configured to generate the secondary actuation signals $O_2$. Such a fixed-purpose hard-wired platform, exemplified in the burned basic input/output system (BIOS) firmware read only memory (ROM) and in programmable/reconfigurable logic devices such as programmable logic array (PLA), programmable array logic (PAL), complex programmable logic device (CPLD), and FPGA, is well known and understood in the art and requires no further description here. Optionally, to further improve security, the secondary control system 250 can be configured to have no two-way communication path with another device.

The overall apparatus may further include an output control device 280 configured to receive the first actuation signals $O_1$ and the second actuation signals $O_2$ and to output either the first actuation signals $O_1$ or the second actuation signals $O_2$ to the controlled system 205 to control operation of the controlled system 205. For example, the output control device 280 can be a simple switch set to connect the actuator 230 to either a line carrying the first actuation signals $O_1$ or a second line carrying the second actuation signals $O_2$. The output control device 280 is configured to be controlled by a monitor device 290.

The monitor device 290 is configured to receive and compare the first actuation signals $O_1$ and the second actuation signals $O_2$, for example, by comparing the expectant actuation signal to one or both of the first actuation signals $O_1$ and the second actuation signals $O_2$, and to determine whether error occurred with respect to one or both of the first and second actuation signals $O_1$ and $O_2$. In one approach, the monitor device 290 accesses a memory 298 configured to store data regarding safe operational parameters including expectant actuation signals based on sensor signals for the controlled system 205 to make the error determination. The memory 298 can be a separate database, an integrated memory device, or other known data storage and access approach. The monitor device 290 sends an output control device signal to the output control device 280 to effect provision of either the first actuation signals $O_1$ or the second actuation signals $O_2$ by the output control device 280 based on whether an error occurred with respect to the first actuation signals $O_1$. Optionally, the monitor device 290 can be configured to send such error occurrence information via a communication port 292, which may be configured to be a one-way only communication path such that error information can be passed to the management system 261 but incoming traffic, which may include malicious software or hacking attempts, is blocked or otherwise not allowed or possible. Such one-way communication ports are known in the art and need no further elaboration herein. In another approach, the monitor device 290 may instead send the error occurrence information by two way communication.

To provide additional security, the monitor device 290 can be implemented using a hardware based approach such that it does not include a software component in determining whether error occurred with respect to the first and second actuation signals $O_1$ and $O_2$ and generating the output control device signal. One such hardware based approach is implementation of a field programmable gate array embodying the logic used to determine error information and output the control device signal. In short, the monitor device 290 reads from the same sensor and monitors the outputs from the primary and secondary control systems and, based on the normal operational behavior stored in the memory, detects abnormal and different outputs for the same input from the two control systems.

Those skilled in the art will recognize and understand that such an apparatus may be comprised of a plurality of physically distinct elements as is suggested by the illustration shown in FIG. 2. It is also possible, however, to view this illustration as comprising a logical view, in which case one or more of these elements can be enabled and realized via a shared platform.

So configured, any corruption of the primary control system's operation will be detected immediately and accurate output control signals will be provided to the controlled system in lieu of the erroneous controls. Because the secondary system is of a type different from the primary control system, the cause for corruption of the primary control system is unlikely to also corrupt the secondary system. For instance, through implementation of a hardware based processing approach in the secondary system's controller and, optionally, the monitor device, software based malicious attacks and vulnerabilities cannot directly corrupt the control signals provided by the redundant controller. Moreover, the error information can be provided immediately to the management system so that remedial action and repair of the primary control system 202 can be provided as soon as possible. Through this configuration of the diverse secondary control system and the monitor, an intended normal operation of the controller system can be maintained by the correct actuator output selection even when the primary controller is compromised by malicious attacks and other errors.

Referring to the FIG. 3, a method of controlling a process or system with protection against software based security attacks will be described. The method includes at a primary control system receiving 305 sensor signals from a sensor and determining 310 first actuation signals configured to control operation of at least a portion of a controlled system by using at least one software based algorithm which relies at least in part on the sensor signals. Then the primary control system, sends 315 the first actuation signals. Optionally, the method may further include the primary control system conducting two-way communication with a communication server or a wide area network.

A redundant and diverse secondary control system also receives 320 the sensor signals from the sensor and independently from the primary control system determines 325 second actuation signals configured to control operation of the at least a portion of the controlled system. The secondary control system does so by using a hardware based system incompatible with the primary control system configured to run a hardware-coded control operation relying at least in part on the sensor signals. An example hardware-coded approach includes determining the secondary actuation signals with a field programmable gate array and without use of a software component configured to generate the secondary actuation signals. When the primary and secondary control systems operate in an expected manner, the second actuation signals are substantially identical to the first actuation signals. The secondary control system sends 330 the secondary actuation signals. To maintain security, the method may include the secondary control system's communicating only in a one-way manner with any other device.

An output control device receives 340 the first actuation signals and second actuation signals. A monitor device receives and compares the first actuation signals and the second actuation signals. The monitor device determines 350 whether error occurred with respect to one or both of the first and second actuation signals. By one approach, the determination 350 is made using a field programmable gate array and without use of a software component to provide additional security in making the determination. In one aspect, the monitor device may access safe operational data stored in a memory to help with the determination. The safe operational data may include expected actuation signals under a condition or state determined by the received sensor signals that can be utilized to compare to one or both of the primary and secondary actuation signals to determine if there is a deviation from the expected actuation signals, thereby an error indication can be obtained. The method further includes sending 360 from the monitor device an output control device signal to the output control device to effect provision of either the first actuation signals or the second actuation signals by the output control device based on whether an error occurred with respect to the first actuation signals. Optionally, the method may further include sending error occurrence information via the two-way communication between the primary control system and with a communication server or a wide area network or via one-way communication between the monitor device and a communication server or wide area network.

The strength and resiliency of the described method of cyber security is explained under a typical scenario of attack or inadvertent error. Let us assume that a hacker, with presumed authenticity and login credentials of the communication server using a virtual private network (VPN) of a remote desktop connection across the Internet uploads a new and malicious code to the primary computer based controller. Then the primary controller would behave abnormally for a given input condition, while the duplicate secondary control system would behave normally. These two different outputs would be detected by the monitor device and the duplicate controller's output would be selected based on the database of normal behavior to control the actuator under the given state or condition of the controlled system determined by the sensor signals.

Therefore, using the described cyber security method, the duplicate computer controller remains intact even under a cyber-attack resulting in a compromised situation in the existing primary computer controller; in which case the monitor device controls the entire system with normal and designed operation. The monitor device would alert the management system via the uni-directional communication path, and personnel would be dispatched to fix or replace the impacted computer controller and devise countermeasures. The described approaches would similarly be immune to a Stuxnet-like attack because any deliberate change and modification remains only on the existing computer controller; the FPGA based duplicate controller operates normally during and after the incident, and the actuator is correctly controlled by the intervention of the supervising monitor device.

So configured, strength and resiliency under a cyber-attack is achieved. Thus, even under cyber events of attack or inadvertent error, reliable and continued service of operation for production processes, assembly lines, water or sewage treatment, power and steam generation, electricity supply, or the like can be assured.

Those skilled in the art will recognize that a wide variety of modifications, alterations, and combinations can be made with respect to the above described embodiments without departing from the scope of the invention. For instance, although the monitor device and output control device are illustrated as separate elements, they could be combined into a single structure functioning as described. Such modifications, alterations, and combinations are to be viewed as being within the ambit of the inventive concept.

What is claimed is:

1. An apparatus providing protection against software based security attacks, the apparatus comprising:
    a primary control system comprising:
    an input port configured to receive sensor signals from a sensor,
    an output port configured to send first actuation signals configured to control operation of at least a portion of a controlled system,
    a hardware component running at least one software based algorithm configured to output the first actuation signals based on the sensor signals;
    a redundant and diverse secondary control system comprising:
    a second input port configured to receive the sensor signals from the sensor,
    a second output port configured to send second actuation signals configured to control operation of the at least a portion of the controlled system,
    a hardware based system incompatible with the primary control system and configured to run at least one hardware-coded algorithm that generates the second actuation signals based on the sensor signals;
    an output control device configured to receive the first actuation signals and the second actuation signals and to output either the first actuation signals or the second actuation signals to the controlled system to control operation of the controlled system;
    a memory configured to store data regarding safe operational parameters including expectant actuation signals based on sensor signals for the controlled system;
    a monitor device configured to:
    receive the sensor signals,
    receive and compare the first actuation signals and the second actuation signals,
    determine whether error occurred with respect to one or both of the first and second actuation signals based on the sensor signals and the stored data for normal operation,
    send an output control device signal to the output control device to effect provision of either the first actuation signals or the second actuation signals by the output control device based on whether an error occurred with respect to the first actuation signals.

2. The apparatus of claim 1 wherein the primary control system further comprises a communication port configured to provide two-way communication with a communication server or a wide area network.

3. The apparatus of claim 2 wherein the monitor device is configured to send error occurrence information via the communication port.

4. The apparatus of claim 1 wherein the secondary control system includes no two-way communication path with another device.

5. The apparatus of claim 1 wherein:
    the secondary control system comprises a field programmable gate array, and
    the secondary control system does not include a software component configured to generate the secondary actuation signals.

6. The apparatus of claim 1 wherein the monitor device further comprises a communication port configured to provide one-way outbound communication with a communication server or a wide area network.

7. The apparatus of claim 1 wherein:
    the monitor device comprises a field programmable gate array, and
    the monitor device does not include a software component configured to one or both of determine whether error occurred with respect to the first and second actuation signals and generate the output control device signal.

8. The apparatus of claim 1 wherein the monitor device is configured to determine whether error occurred with respect to one or both of the first actuation signals and the second actuation signals by comparing the expectant actuation signal to one or both of the first actuation signals and the second actuation signals.

9. The apparatus of claim 1, wherein the at least one hardware-coded algorithm only uses hardware components to generate the second actuation signals based on the sensor signals.

10. A method of controlling a process or system with protection against software based security attacks, the method comprising:
    at a primary control system:
    receiving sensor signals from a sensor,
    determining first actuation signals configured to control operation of at least a portion of a controlled system by using at least one software based algorithm which relies at least in part on the sensor signals,
    sending the first actuation signals;
    at a redundant and diverse secondary control system:
    receiving the sensor signals from the sensor,
    determining second actuation signals configured to control operation of the at least a portion of the controlled system by using a hardware based system incompatible with the primary control system configured to run a hardware-coded control operation relying at least in part on the sensor signals,
    sending the second actuation signals;
    receiving the first actuation signals and the second actuation signals at an output control device;
    at a monitor device:
    receiving the sensor signals,
    receiving and comparing the first actuation signals and the second actuation signals,
    determining whether error occurred with respect to one or both of the first and second actuation signals,
    sending an output control device signal to the output control device to effect provision of either the first actuation signals or the second actuation signals by the output control device based on whether an error occurred with respect to the first actuation signals;
    outputting from the an output control device either the first actuation signals or the second actuation signals to the controlled system to control operation of the controlled system based on the output control device signal.

11. The method of claim 10 further comprising conducting two-way communication between the primary control system and with a communication server or a wide area network.

12. The method of claim 11 further comprising sending error occurrence information via the two-way communication between the primary control system and with a communication server or a wide area network.

13. The method of claim 10 further comprising communicating only in a one way manner between the secondary control system and another device.

14. The method of claim 10 wherein the determining the secondary actuation signals comprises determining the secondary actuation signals with a field programmable gate array and without use of a software component configured to generate the secondary actuation signals.

15. The method of claim 10 further comprising communicating only in a one way manner between the monitor device and with a communication server or a wide area network.

16. The method of claim 10 wherein the determining whether error occurred comprises determining whether error occurred using a field programmable gate array and without use of a software component.

17. The method of claim 10 wherein the determining whether error occurred comprises accessing safe operational data stored in a memory and by comparing expected actuation signals against one or both of the primary and secondary actuation signals.

18. An apparatus providing protection against software based security attacks, the apparatus to be used with a primary control system comprising an input port configured to receive sensor signals from a sensor, an output port configured to send first actuations signals configured to control operation of at least a portion of a controlled system, and a hardware component running at least one software based algorithm configured to output the first actuation signals based on the sensor signals, the apparatus comprising:
 a redundant and diverse secondary control system comprising:
  a second input port configured to receive the sensor signals from the sensor,
  a second output port configured to send second actuations signals configured to control operation of the at least a portion of the controlled system,
  a hardware based system incompatible with the primary control system configured to run at least one hardware-coded algorithm that generates the second actuation signals based on the sensor signals,
 an output control device configured to receive the first actuation signals and the second actuation signals and to output either the first actuation signals or the second actuation signals to the controlled system to control operation of the controlled system;
 a memory configured to store data regarding safe operational parameters including expectant actuation signals based on sensor signals for the controlled system;
 a monitor device configured to:
  receive the sensor signals,
  receive and compare the first actuation signals and the second actuation signals,
  determine whether error occurred with respect to the first and second actuation signals by comparing the expectant actuation signal to one or both of the first actuation signals and the second actuation signals based on the sensor signals,
  send an output control device signal to the output control device to effect provision of either the first actuation signals or the second actuation signals by the output control device based on whether an error occurred with respect to the first actuation signals.

19. The apparatus of claim 18 wherein the secondary control system includes no two-way communication path with another device.

20. The apparatus of claim 18 wherein:
 the secondary control system comprises a field programmable gate array, and
 the secondary control system does not include a software component configured to generate the secondary actuation signals.

21. The apparatus of claim 18 wherein the monitor device further comprises a communication port configured to provide one-way outbound communication with a communication server or a wide area network.

22. The apparatus of claim 18 wherein:
 the monitor device comprises a field programmable gate array, and
 the monitor device does not include a software component configured to one or both of determine whether error occurred with respect to the first actuation signals and generate the output control device signal.

* * * * *